United States Patent
Hirai et al.

(10) Patent No.: US 12,554,896 B2
(45) Date of Patent: Feb. 17, 2026

(54) SYSTEM OF IO PROCESSING FOR STORAGE CONTROL UNIT FOR ENCRYPTION/DECRYPTION

(71) Applicant: Hitachi, Ltd., Tokyo (JP)

(72) Inventors: Tatsuya Hirai, Tokyo (JP); Takahiro Yamamoto, Tokyo (JP); Yoshinori Ohira, Tokyo (JP)

(73) Assignee: HITACHI VANTARA, LTD., Yokohhama (JP)

( * ) Notice: Subject to any disclaimer, the term of this patent is extended or adjusted under 35 U.S.C. 154(b) by 159 days.

(21) Appl. No.: 18/461,722

(22) Filed: Sep. 6, 2023

(65) Prior Publication Data

US 2024/0211640 A1  Jun. 27, 2024

(30) Foreign Application Priority Data

Dec. 21, 2022 (JP) .................. 2022-204027

(51) Int. Cl.
| | |
|---|---|
| *H04L 9/14* | (2006.01) |
| *G06F 12/14* | (2006.01) |
| *G06F 13/16* | (2006.01) |
| *G06F 21/60* | (2013.01) |
| *G06F 21/78* | (2013.01) |
| *H04L 9/08* | (2006.01) |

(52) U.S. Cl.
CPC .......... *G06F 21/78* (2013.01); *G06F 13/1668* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 9,330,270 B2 * | 5/2016 | Ochiai ................. | G06F 21/44 |
| 9,547,777 B2 * | 1/2017 | Schneider .............. | G06F 21/64 |
| 2004/0015723 A1 * | 1/2004 | Pham .................... | H04L 63/10 |
| | | | 709/217 |
| 2004/0078568 A1 * | 4/2004 | Pham .................. | G06F 21/6218 |
| | | | 713/165 |
| 2008/0260161 A1 * | 10/2008 | Yokota ............. | G11B 20/00818 |
| | | | 380/278 |

(Continued)

FOREIGN PATENT DOCUMENTS

JP  6114397 B2  4/2017

*Primary Examiner* — Venkat Perungavoor
(74) *Attorney, Agent, or Firm* — Volpe Koenig

(57) ABSTRACT

An information processing system includes a physical drive, a compute unit, and a storage control unit that processes a data input/output request from the compute unit, in which: the storage control unit includes an IO processing unit and an encryption/decryption-related processing unit; the encryption/decryption-related processing unit is capable of referring to key generation method information including at least one element used to generate a key used to encrypt/decrypt the data and an algorithm for generating a key by using the element; and the encryption/decryption-related processing unit generates a key used to encrypt/decrypt the data according to a content set in the key generation method information, and encrypts data received from the compute unit by the IO processing unit or decrypts data read from the physical drive by the IO processing unit by using the key.

6 Claims, 12 Drawing Sheets

(56) References Cited

U.S. PATENT DOCUMENTS

| | | | |
|---|---|---|---|
| 2009/0196417 A1* | 8/2009 | Beaver | G06F 21/80 380/45 |
| 2011/0099369 A1* | 4/2011 | Lee | H04L 9/3263 713/165 |
| 2015/0127854 A1 | 5/2015 | Yamamoto et al. | |
| 2015/0379276 A1* | 12/2015 | Glickman | H04L 9/0861 713/193 |
| 2016/0232383 A1* | 8/2016 | Chakhaiyar | G06F 3/0622 |
| 2016/0285632 A1* | 9/2016 | Akiba | H04L 9/0822 |
| 2017/0286319 A1* | 10/2017 | Abbas | G06F 21/44 |
| 2019/0340136 A1* | 11/2019 | Irwin | G06F 3/0608 |
| 2022/0200799 A1* | 6/2022 | Wade | H04L 9/0869 |

* cited by examiner

| STORAGE POOL ID | STORAGE CONTROL NODE ID | PHYSICAL DRIVE ID | ADDRESS |
|---|---|---|---|
| SP0 | SN0 | Drv000 | 32:134217728 |
|  |  | Drv001 | 32:134217728 |
|  |  | ... | ... |
|  | SN1 | Drv010 | 32:134217728 |
|  |  | ... | ... |
|  | SN2 | Drv020 | 32:134217728 |
|  |  | ... | ... |
| SP1 | SN0 | Drv100 | 134217729:268435456 |
|  |  | Drv101 | 134217729:268435456 |
|  |  | ... | ... |
|  | SN1 | Drv110 | 134217729:268435456 |
|  |  | ... | ... |
|  | SN2 | Drv120 | 134217729:268435456 |
|  |  | ... |  |
| ... |  |  |  |

| STORAGE POOL ID | ACCESS PERMISSION HOST ID |
|---|---|
| SP0 | VM00 |
| | VM01 |
| | ... |
| SP1 | VM10 |
| | ... |
| | |
| ... | |

| 901 | 902 | 903 | | |
|---|---|---|---|---|
| IO KEY GENERATION ELEMENT NUMBER | IO KEY GENERATION ALGORITHM | IO KEY GENERATION ELEMENT | | |
| 2 | CONCATENATION + SHA512 | PHYSICAL DRIVE KEY | STORAGE POOL KEY | |

910

| 911 | 912 | 913 | 914 | 915 |
|---|---|---|---|---|
| DRIVE ID | PHYSICAL DRIVE KEY ID | DRIVE KEY | STORAGE POOL ID | IO KEY |
| Drv000 | a038bc12-... | 7a2bef01... | SP0 | a29fd843... |
|  |  |  | SP1 | f1b3d7ec... |
|  |  |  | ... |  |
| D0rv01 | 39d27bc5-... | 386d2b4c... | SP0 | 26d5c0f1... |
|  |  |  | SP1 | 58ba37ed... |
| ... |  |  | ... |  |

920

| 921 | 922 | 923 |
|---|---|---|
| STORAGE POOL ID | STORAGE POOL KEY ID | STORAGE POOL KEY |
| SP0 | 9a4db3f7-... | 8c32f51d... |
| SP1 | 1cd75baf-... | 4ef0a6ed... |
| ... |  |  |

SYSTEM OF IO PROCESSING FOR STORAGE CONTROL UNIT FOR ENCRYPTION/DECRYPTION

BACKGROUND OF THE INVENTION

1. Field of the Invention

The present invention generally relates to a technique for managing data.

2. Description of the Related Art

Conventionally, an information and communication technology (ICT) infrastructure system has often been configured as a three-layer system. The three layers are a server/compute layer that provides calculation resources, a storage layer that provides resources for storing data, and a network layer that provides resources for connecting resources of the compute layer and resources of the storage layer. In the three-layer configuration, each of the compute layer and the storage layer includes a plurality of computer devices. Hereinafter, a computer device which is a component of the compute layer is referred to as a compute node, and a computer device which is a component of the storage layer is referred to as a storage control node. In particular, regarding the compute node, a method of using a compute node having been widely adopted in the related art is either a mode (physical machine) in which after a UNIX (registered trademark) or Windows (registered trademark)-based operating system (OS) is installed, various application software operating on the OS is installed and used, or a mode (virtual machine) in which a plurality of UNIX or Windows-based OSs are installed after a hypervisor is installed, and various application software is installed and used.

In each storage control node, a plurality of physical drives for storing normal user data are mounted. Examples of the physical drive in the above description are a hard disk drive, a solid state drive (SSD), a non-volatile memory express (NVMe) drive, and the like. In the storage system, each storage control node integrally manages a plurality of physical drives to configure one logical drive having a large capacity, and presents the logical drive to a physical machine or a virtual machine in the compute layer. In this specification, this logical drive is referred to as a storage pool. For the physical drives constituting the storage pool, in addition to the user data written into and read from the physical machine or the virtual machine in the compute layer, the parity data created by the storage control node is distributively stored in a plurality of physical drives. A plurality of volumes can be created from the storage pool within a range in which the total capacity is equal to or less than the capacity of the storage pool. The created volume is logically connected to a physical machine or a virtual machine in the compute layer. The physical and virtual machines achieve storage of the user data in the storage system by writing the user data to the volume connected thereto.

Note that, regarding the storage layer, drive boxes including a network connection interface such as JBOD (Just a Bunch of Disks) and FBOF (Fabric-attached Bunch of Flash) have been commercialized in recent years. When these drive boxes are used, the storage control node only controls writing and reading of the user data and the parity data into and from the drive box connected from the storage control node via a network, and the drive box generally serves to store the data. Although the configuration is different from a conventional storage control node incorporating a drive that stores user data, a role played by the storage control node and the entire drive box is the same as a role played by the conventional storage control node.

In addition, in order that a plurality of compute nodes share a storage, a technique disclosed in JP 6114397 B2 has been known.

JP 6114397 B2 discloses "a storage system comprising: at least one storage boxes having a plurality of storage devices; and at least one storage systems that are connected to the at least one storage boxes, receive an I/O (Input/Output) command designating an I/O destination from a host device, and process the I/O command, wherein when a configuration change in which a control permission for a storage area is set to any one of the at least one storage systems, and the number of the storage boxes relative to the number of the storage systems is relatively changed is performed, in response to transmission of information from a first storage system that is a storage system that causes the configuration change, at least one control permission is transferred between a second storage system that is any one of the storage systems existing after the configuration change and the first storage system, and the control permission is a permission to process an I/O command with a storage area corresponding to the control permission as an I/O destination, and data to be written into the storage area is stored in any of the plurality of storage devices".

In the above-described ICT infrastructure system, in a case where the mounted drive is illicitly extracted from the storage control node or the drive box, or the drive mounted in the storage control node is replaced with a new drive having a larger capacity, it is required to take a measure so as not to leak the user data stored in the illicitly extracted drive or the original drive. As an effective method therefor, there is a method of allocating a different key for each drive.

In this method, a different key is assigned to each drive, the user data written to the drive is encrypted using the key, and the user data in a state of an encrypted text is stored in each drive. When the drive has been illicitly taken out or the drive has been replaced, the key allocated to the drive is completely discarded. By executing the foregoing, it is possible to prevent the user data stored in the drive from being converted to a plain text by the user who does not have the key used for the encryption with the strength of the algorithm used for the encryption.

Although the protection of the user data on the drive at the time of unauthorized removal or replacement of the drive has been described above, in the situation described below, it is required to protect the user data from a viewpoint different from the above. One example is a case where one storage system is used from a compute node or a virtual machine on the compute node owned by a plurality of different organizations. Examples of the above described different organizations include a plurality of separate private companies, a private company and a public institution, and a plurality of departments in one private company. Such an organization is referred to herein as a tenant. In such a case, while the storage system provides a separate storage area to each tenant, in a case where there is no tenant using a certain storage area or the tenant has stopped using the storage area, it is required that the user data stored in the storage area is made unavailable thereafter. As an effective method for responding to the above demand, a method of allocating a different key for each storage pool has been known.

In this method, the storage system provides a specific storage pool to each organization, and the storage control node allocates a different key for each storage pool. Then, when the storage control node receives a write request to a volume created in the storage pool and user data to be written, the node encrypts the received user data using the key and then executes writing into the physical drive corresponding to the writing destination storage area. Similarly, when the storage control node receives the read request from the volume created in the storage pool, the node reads the user data requested from the physical drive corresponding to the storage area of the reading source, decrypts the read user data using the key allocated to the storage pool, and then transmits the user data to the physical or virtual machine of the contributing layer that has requested the user data.

SUMMARY OF THE INVENTION

Problems to be Solved by the Invention

The method of allocating different keys for each drive and the method of allocating different keys for each storage pool are actually applied to a storage system in a three-layer configuration.

On the other hand, in a situation where a plurality of tenants uses one storage system, a plurality of storage pools is created in the storage system, and separate storage pools are provided for each tenant, in order to more efficiently use the physical drive, the following configuration is effective. That is, regarding a configuration method of the storage pool, on the premise that the entire storage area of each physical drive is used, a storage pool is configured by collecting a part of the storage areas included in each physical drive instead of bundling a plurality of physical drives into a storage pool. When the storage pool is configured as described above, in a case where there is no free capacity in the storage pool provided to a certain tenant, an unused area remaining in any physical drive is added to the storage pool, so that the use can be continued without adding a new physical drive. On the other hand, when a storage pool is formed by bundling a plurality of physical drives, it is necessary to add a physical drive to a storage control node or a drive box when there is no free capacity in the storage pool.

However, configuring the storage pool as described above involves the following problems.

In the method of allocating different keys for each storage pool, only a specific tenant can use the user data in the plain text state. On the other hand, since the encrypted user data is stored in a distributed manner in a plurality of drives that provide a part of its own storage area to the storage pool, in a case where a certain drive has been replaced or a certain drive has been illicitly taken out, the key used to encrypt the user data stored in the drive is also used to encrypt/decrypt the user data stored in another physical drive, and thus cannot be discarded. Therefore, if the key is leaked from the storage system, the user data stored in the drive may be decrypted and leaked.

In the method of allocating a different key to each drive, as described above, when each physical drive has been replaced or illicitly taken out, the key allocated to the physical drive can be discarded. On the other hand, since the user data used by each tenant is encrypted with the key allocated to each physical drive, it is not possible to suppress the risk of decrypting the user data used by the tenant by discarding the key in a case where a certain tenant has stopped using the storage pool used until then or the tenant has left.

Therefore, if both the method of allocating a different key for each drive and the method of allocating a different key for each storage pool are used in combination, it is possible to solve the above two problems by discarding the key allocated to the drive in a case where the physical drive has been replaced or illicitly taken out, and discarding the key allocated to the storage pool provided to the tenant in a case where the tenant stopped using the storage pool or the tenant has left. However, in a case where writing or reading into or from a physical machine or a virtual machine in the compute layer is performed with the combination of the above two methods, encryption/decryption is required twice for both the user data and the parity data, and there is a possibility that writing and reading performance of the user data deteriorates.

In order to solve the above problems, a representative information processing system of the present invention includes: a physical drive that statically stores data, a compute unit that operates an application program, and a storage control unit that processes a data input/output request by the compute unit that has received an instruction from the application program, in which:

the storage control unit includes an IO processing unit that executes writing of the data into the physical drive and reading of the data from the physical drive on a basis of the input/output request, and an encryption/decryption-related processing unit that performs encryption/decryption of the data, the encryption/decryption-related processing unit is capable of referring to key generation method information including at least one element used to generate a key used to encrypt/decrypt the data and an algorithm for generating a key by using the element, the encryption/decryption-related processing unit generates a key used to encrypt/decrypt the data according to a content set in the key generation method information, and encrypts data received from the compute unit by the IO processing unit or decrypts data read from the physical drive by the IO processing unit by using the key, and the IO processing unit writes data encrypted by the encryption/decryption-related processing unit into the physical drive, and transmits the data decrypted by the encryption/decryption-related processing unit to the compute unit.

Furthermore, a representative information processing method of the present invention is an information processing method for an information processing system including a physical drive that statically stores data, a compute unit that operates an application program, and a storage control unit that processes a data input/output request by the compute unit that has received an instruction from the application program, in which:

the storage control unit includes an IO processing unit that executes writing of the data into the physical drive and reading of the data from the physical drive on a basis of the input/output request, and an encryption/decryption-related processing unit that performs encryption/decryption of the data; and the encryption/decryption-related processing unit is capable of referring to key generation method information including at least one element used to generate a key used to encrypt/decrypt the data and an algorithm for generating a key by using the element, the method including:

generating, by the encryption/decryption-related processing unit, a key used to encrypt/decrypt the data according to a content set in the key generation method information;

encrypting, by the encryption/decryption-related processing unit, data received from the compute unit by using the key, or decrypting, by the encryption/decryption-related processing unit, data read from the physical drive by using the key; and writing, by the IO processing unit, data encrypted by the encryption/decryption-related processing unit into the physical drive, or transmitting, by the IO processing unit, the data decrypted by the encryption/decryption-related processing unit to the compute unit.

According to the present invention, it is possible to realize a highly reliable information processing system. Problems, configurations, and effects other than those described above will be clarified by the following description of embodiments.

BRIEF DESCRIPTION OF THE DRAWINGS

FIG. 7 is a diagram illustrating an example of data arranged on a memory of the storage control node according to the embodiment;

FIG. 8 is a diagram illustrating an example of data arranged on a memory of the storage control node according to the embodiment;

FIG. 9 is a diagram illustrating an example of data arranged on a memory of the storage control node according to the embodiment;

DESCRIPTION OF THE PREFERRED EMBODIMENTS

First Embodiment

Figure 1:
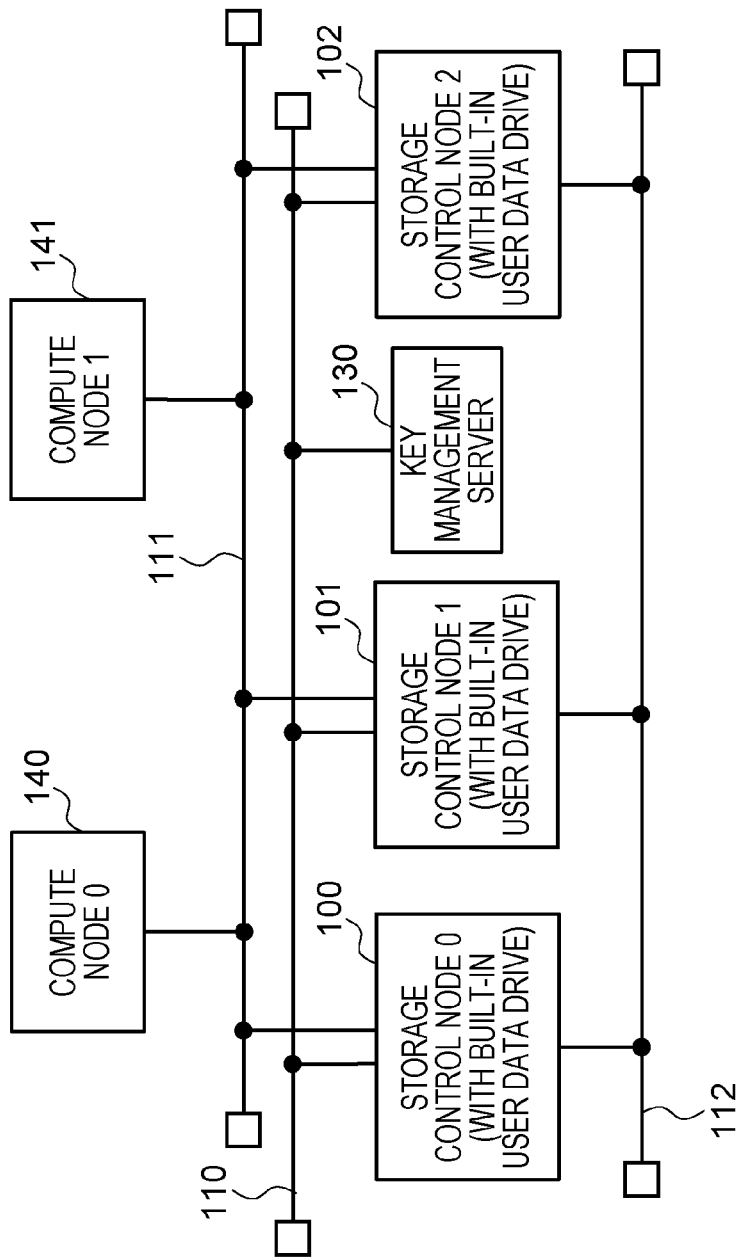
FIG. 1 is a block diagram illustrating an example of a configuration of an information processing system according to an embodiment.

The present invention relates to an information processing system, a storage system, a data transfer method, and a data encryption/decryption method, and is suitably applied to, for example, a system equipped with a flash drive. Hereinafter, an embodiment of the present invention will be described in detail. However, the present invention is not limited to the embodiment.

Hereinafter, an embodiment of the present invention will be described in detail with reference to the drawings. The following description and drawings are examples for describing the present invention, and omission and simplification are made as appropriate for the sake of clarity of description. In addition, not all combinations of features described in the embodiments are essential to the solution of the problems of the invention. The present invention is not limited to the embodiment, and all application examples consistent with the idea of the present invention are encompassed in the technical scope of the present invention. Those skilled in the art can make various additions, modifications, and the like to the present invention within the scope of the present invention. The present invention can be implemented in various other forms. Unless otherwise specified, each component may be plural or singular.

In the following description, various types of information may be described with expressions such as a table and a list, but the various types of information may be expressed with other data structures. The "XX table", the "XX list", and the like may be referred to as "XX information" to indicate that they do not depend on the data structure. Expressions such as "identification information", "identifier", "name", "ID", and "number" are used to describe the content of each piece of information, but these expressions can be replaced with each other.

In addition, in the following description, when the same kind of elements are described without distinction, common numbers are used in reference numerals or reference symbols, or the reference numerals are omitted. In addition, when the same type of element is described distinctively, the reference symbol of the element may be used or the ID allocated to the element may be used instead of the reference symbol.

The program may be installed in a device such as a computer from a program source. The program source may be, for example, a program distribution server or a computer-readable storage medium. When the program source is a program distribution server, the program distribution server includes a processor (for example, a central processing unit (CPU)) and a storage resource, and the storage resource may further store a distribution program and a program to be distributed. Then, when the processor of the program distribution server executes the distribution program, the processor of the program distribution server may distribute the program to be distributed to another computer. In the following description, two or more programs may be implemented as one program, or one program may be implemented as two or more programs.

Notations such as "first", "second", and "third" in the present specification and the like are attached to identify components, and do not necessarily limit the number or order. In addition, a number for identifying a component is used for each context, and a number used in one context does not necessarily indicate the same configuration in another context. In addition, it does not prevent a component identified by a certain number from also functioning as a component identified by another number.

FIG. 1 is a block diagram illustrating an example of a configuration of a three-layer information processing system according to the present embodiment. The information processing system includes at least one compute node 140, 141, a key management server similar to the key management server 130, and a storage control node 100, 101, 102 as elements. The compute node 140, 141 is denoted with indices 0 to 1, and the storage control node 100, 101, 102 is denoted with indices 0 to 2. The compute node 140, 141 and the storage control node 100, 101, 102 are connected to a management communication network 110 and a storage communication network 111. The storage control node 100, 101, 102 is also connected to a back-end communication network 112. The management information is transferred on the management communication network 110, while the user data is transferred on the storage communication network 111 between the compute node and the storage control node, and on the back-end communication network 112 between the storage control nodes.

Figure 2:
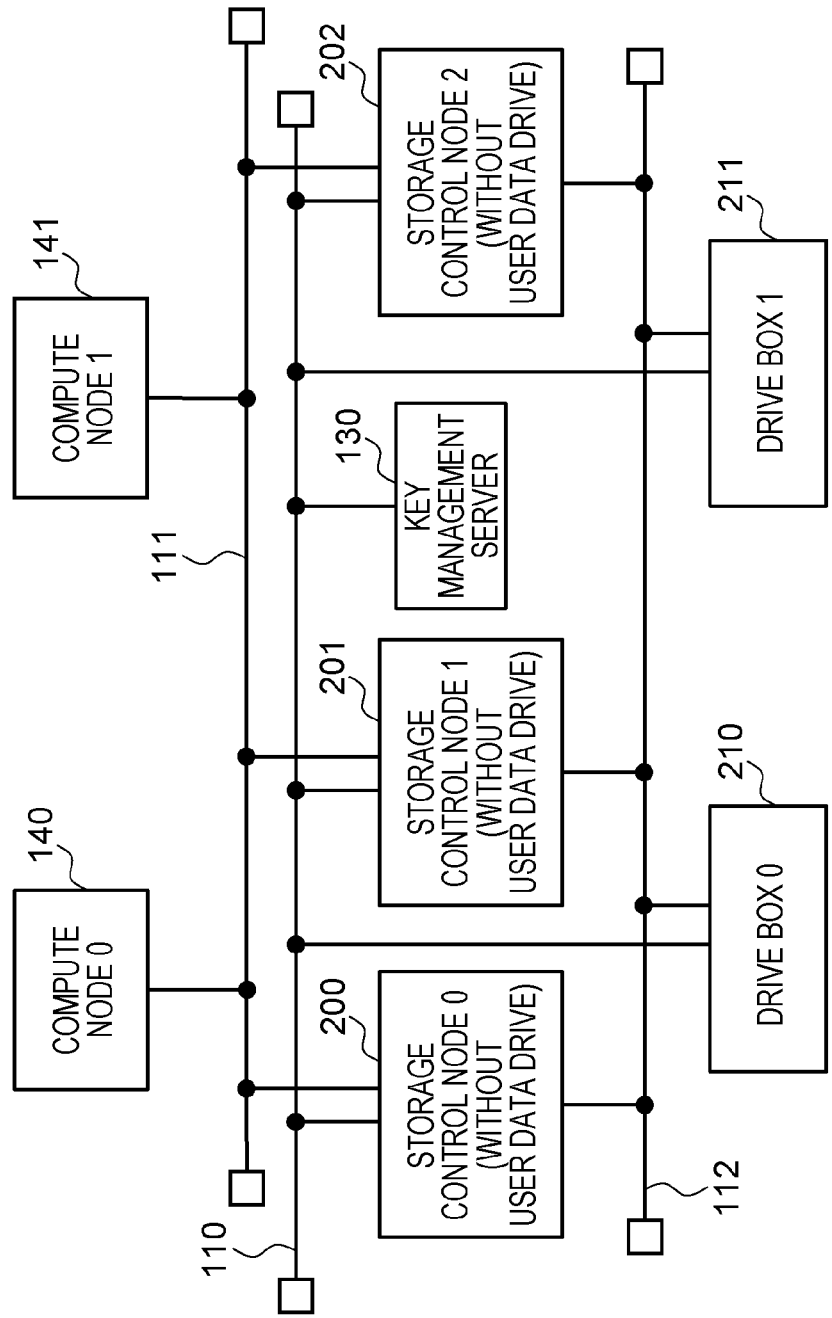
FIG. 2 is a block diagram illustrating an example of a configuration of an information processing system using a drive box according to the embodiment.

Similarly to FIG. 1, FIG. 2 is a block diagram illustrating an example of a configuration of a three-layer information processing system according to the present embodiment. However, in the present information processing system, a storage drive (drive) that stores data is mounted in the drive box 210, 211 outside the storage control node 200, 201, 202. The drive box 210, 211 is connected to each storage control node 200, 201, 202 via the back-end communication network 112. The other aspects are the same as those in FIG. 1.

Next, roles of the compute node, the storage control node, the drive box, and the key management server illustrated in FIGS. 1 and 2 will be briefly described.

The compute node 140, 141 is a general-purpose computer device (server) that functions as a host (host device) for the storage control node 100, 101, 102. Note that each compute node 140, 141 may function as a host for the storage control node 100, 101, 102 as a physical machine, or at least one virtual machine may be configured on the node, and each virtual machine may function as a host for the storage control node 100, 101, 102. The virtual machine may be in the form of a container.

The compute node 140, 141 requests the storage control node 100, 101, 102 to write or read user data via the storage communication network 111 in response to a user operation or a request from an application program operating on the node. Regarding the writing of the user data, the compute node 140, 141 transmits the write target user data to the storage control node 100, 101, 102 following the write request. A series of processes related to the writing of the user data will be described in detail as a user data writing process with reference to FIGS. 9 and 10. Regarding the reading of the user data, the compute node 140, 141 transmits a read request to the storage control node 100, 101, 102, and then receives the requested user data from the storage control node 100, 101, 102, 200, 201, 202 or the drive box 210, 211. In the case of the configuration as illustrated in FIG. 2, the storage control node 200, 201, 202 having received the read request determines which of the storage control node 200, 201, 202 and the drive box 210, 211 transmits the requested user data to the compute node 140, 141.

In the drive box 210, 211, generally a plurality of drives for storing user data is mounted inside, and when receiving a write request of user data and user data to be written from the storage control node 200, 201, 202, the received data is written to a physical drive attached to the drive box, and when receiving a read request of user data, the user data stored in a designated physical drive is read and transmitted to a designated transmission destination.

The key management server 130 is a server having a function of generating and storing key data necessary for encrypting plain text user data written to a physical drive (storage device for storing user data mounted on the storage control node 100, 101, 102, 200, 201, 202 or the drive box 210, 211) and for decrypting encrypted text user data read from the physical drive or drive box. An example of a main protocol used for communication between the storage control node 100, 101, 102, 200, 201, 202 and the key management server 130 is Key Management Interoperability Protocol (KMIP). A message transferred according to the protocol is usually protected according to the Transport Layer Security (TLS) protocol.

Next, a schematic internal configuration of the compute node, the storage control node, the key management server, and the drive box illustrated in FIGS. 1 and 2 will be described with reference to FIGS. 3 and 4.

Figure 3:
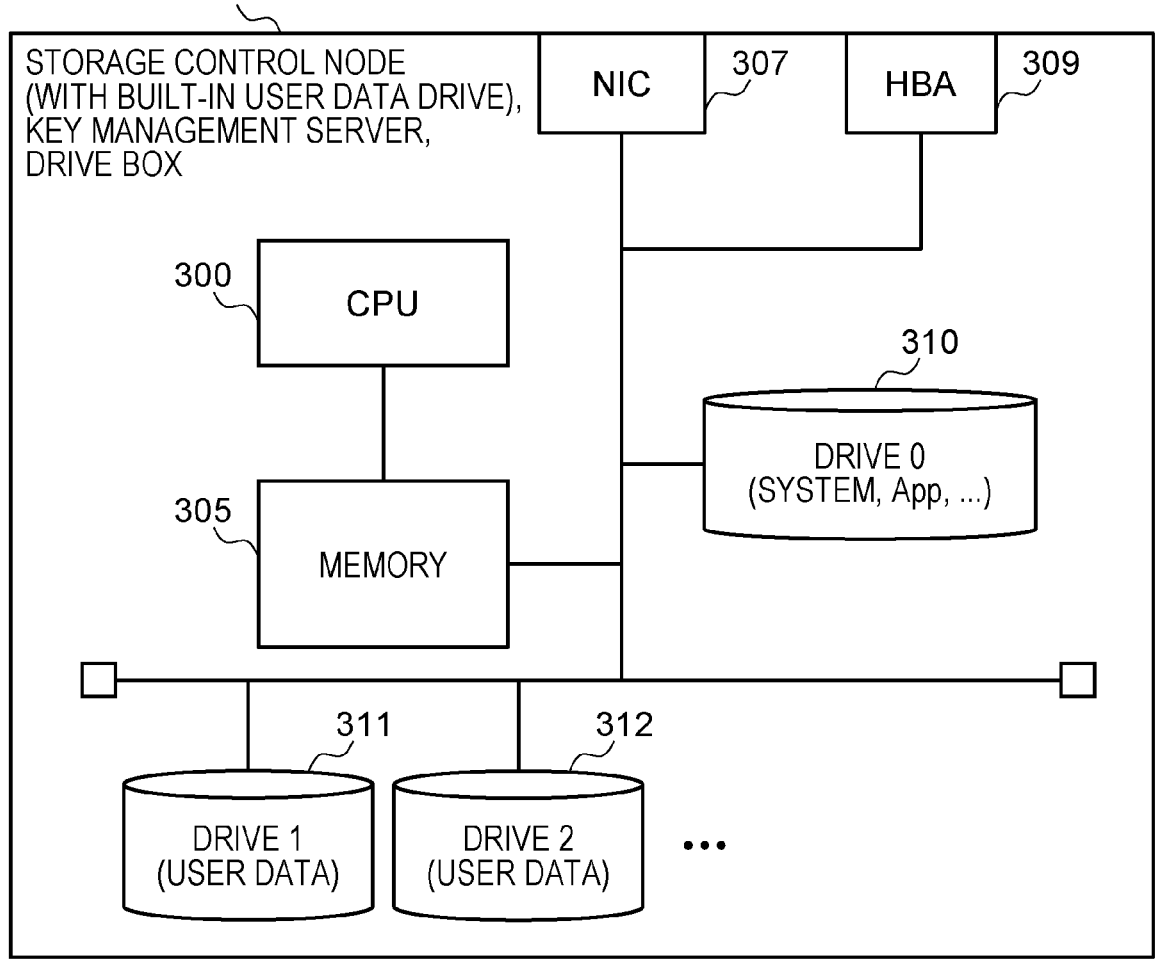
FIG. 3 is a diagram illustrating an example of a configuration of a storage control node (including a data storage drive), a drive box, and a key management server according to the embodiment.

FIG. 3 illustrates an example of a configuration of the storage control node 100, 101, 102 equipped with a user data storage drive, the drive box 210, 211, and the key management server 130. These include at least one CPU 300, at least one memory 305, at least one physical drive 310 (drive 0) for storing a system software program or an application program, a first network communication unit 307 (Network Interface Card (NIC)), the second network communication unit 309 (Host Bus Adapter (HBA)), and at least one physical drive 311, 312 (drive 1, 2) for storing the user data.

A plurality of the first network communication units 307 and a plurality of the second network communication units 509 may be provided. The first network communication unit 307 and the second network communication unit 309 are interfaces for communicating with other storage control nodes, compute nodes, and drive boxes through the management communication network 110, the storage communication network 111, and the back-end communication network 112.

Examples of the system software program stored in the drive 0 (310) include a virtual machine monitor (hypervisor) or a bare metal OS for constructing a virtual environment on the own node, a software program (hereinafter referred to as a storage control program) for realizing a storage function, and a guest OS operating on the hypervisor. The storage control program may operate in any of the hypervisor, the guest OS on the hypervisor, and the bare metal OS. In an environment in which an operating hypervisor operates, the storage control program may operate on the guest OS.

The CPU 300 is a processor that controls the operation of the entirety of the storage control node, the drive box, and the key management server. The memory 305 is implemented using a volatile semiconductor memory such as a static random access memory (SRAM) or a dynamic random access memory (DRAM), or a nonvolatile semiconductor memory, and is used as a work memory of the CPU 300 to temporarily hold various programs, necessary information, and user data. At least one CPU 300 executes the program stored in the memory 305 to execute various processes described later. The physical drive 310, 311, 312 (drive 0, 1, 2) is configured with a large-capacity nonvolatile storage device such as a hard disk drive (HDD), a solid state drive (SSD), and a storage class memory (SCM). These include interfaces such as the non-volatile memory express (NVMe), the serial attached SCSI (SAS), and the serial ATA (SATA).

Figure 4:
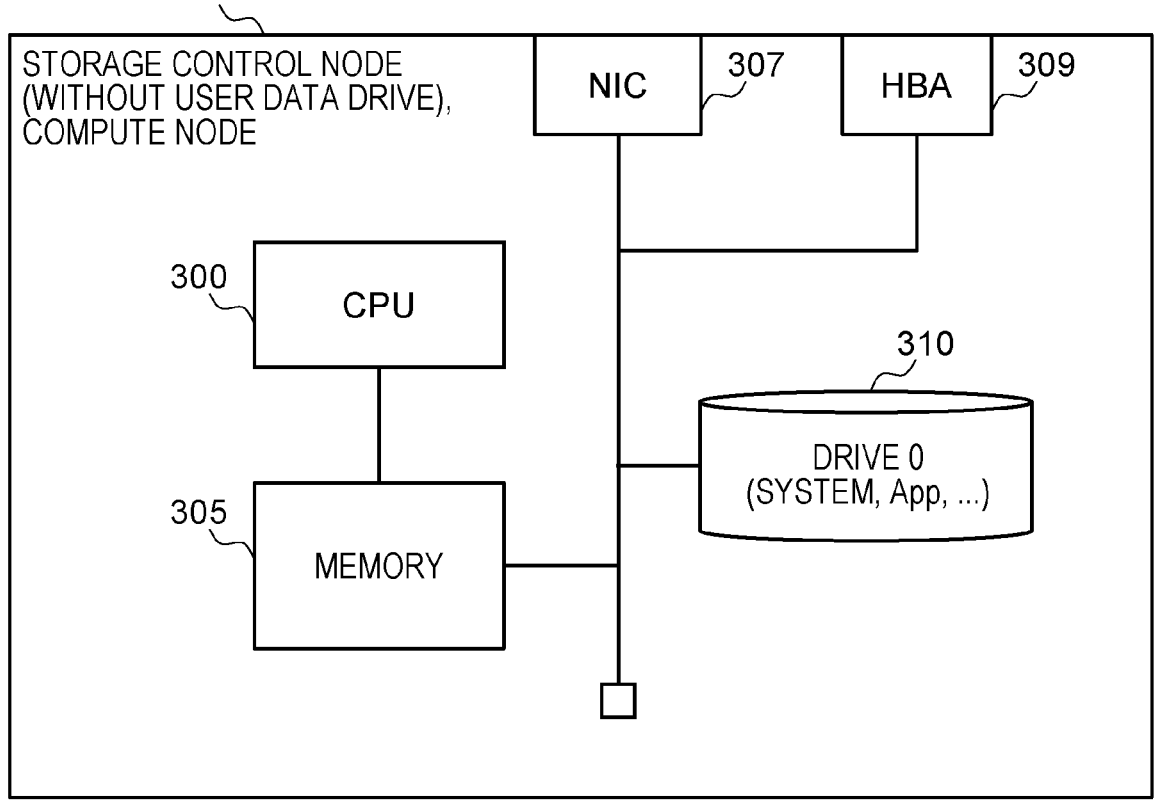
FIG. 4 is a diagram illustrating an example of a configuration of a storage control node (without a data storage drive) and a compute node according to the embodiment.

FIG. 4 illustrates an example of a configuration of the compute node 140, 141 and the storage control node (200, 201, 202) not equipped with the physical drive for data storage. This configuration is the same as the configuration illustrated in FIG. 3 except that the drive 1 (311) and the drive 2 (312) for user data storage are not provided.

Figure 5:
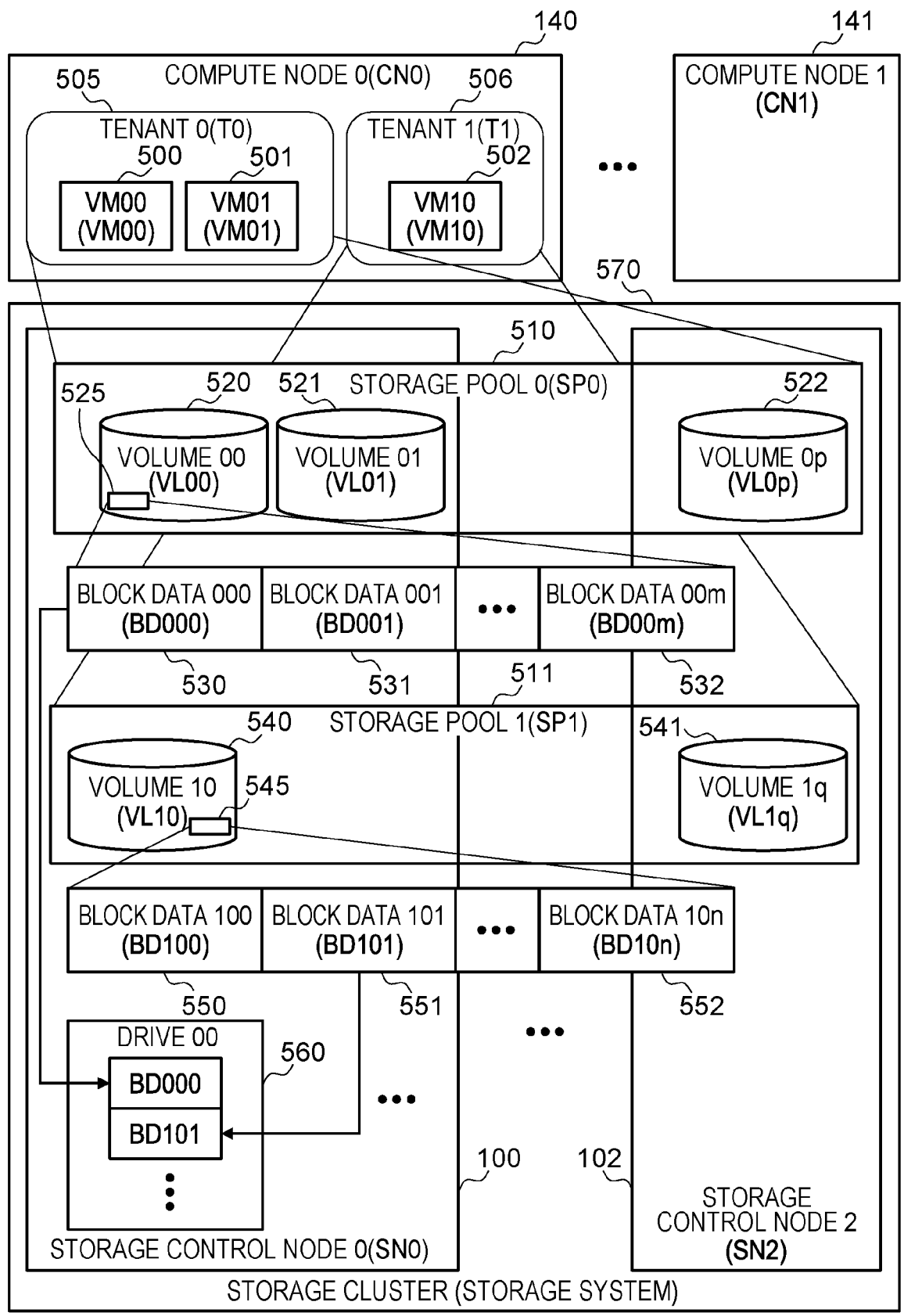
FIG. 5 is a diagram illustrating a relationship between user data used in the compute node and user data stored in a physical drive mounted on the storage control node according to the embodiment.

FIG. 5 illustrates a relationship between user data used in the compute node 140, 141 and user data stored in the physical drive mounted on the storage control node 100, 101, 102, that is assumed in the present embodiment. In the diagram, only the nodes with indices 0 and 1 (CN0 (140), CN1 (141)) for the compute node and the nodes with indices 0 and 2 (SN0 (100), SN2 (102)) for the storage control node are illustrated in accordance with FIGS. 1 and 2, but this is merely an example. The number of nodes actually installed is not limited thereto. In addition, although a mode in which the physical drive is mounted on the storage control node (mode of FIG. 1) is assumed and illustrated, the same applies to a case where a drive box is used. As described in the related art, the constructed storage control node constitutes a system as a whole. In particular, in the sense that a plurality of the storage control nodes cooperate with each other, this is hereinafter referred to as a storage cluster 570.

In the present embodiment, as described in "Problems to be Solved by the Invention", it is assumed that a plurality of storage pools 510, 511 are configured in the storage cluster 570 and each storage pool is provided to each tenant. FIG. 5 illustrates how two tenants (tenant 0 (505) T0, tenant 1 (506) T1) use the storage cluster 570. T0 (505) uses two virtual machines (500, 501) VM00 and VM01 configured on the compute node 0 (140), and T1 uses one virtual machine (502) VM10 also configured on the compute node 0 (140). The storage cluster provides a storage pool 0 (510) for T0 (505), that is VM00 (500) and VM01 (501), and a storage pool 1(540) for T1 (506), that is VM10 (502).

A plurality of volumes can be created in each of the storage pool 0 (510) SP0 and the storage pool 1 (540) SP1. FIG. 5 illustrates a state in which a volume 00 (520) VL00, a volume 01 (521) VL01, and a volume 0p (522) (VL0p) are created in SP0 (510), and a volume 10 (540) VL10 and a volume 1q (541) (VL1q) are created in SP1 (511). Writing and reading of the user data by the VM00 (500) and the VM01 (501) are executed for any of the VL00 (520), the VL01 (521), and the VL0p (522), and writing and reading of the user data by the VM10 (502) are executed for any of the VL10 (540) and the VL1q (541). In the following description, it is assumed that the VM00 (500) writes the user data to the VL00 (520) and the VM10 (502) writes user data to the VL10 (540).

When the VM00 (500) writes the user data (525) to the VL00 (520), the SN0 (100) divides the data into a plurality of blocks. In the present embodiment, this is referred to as block data. In the drawing, the user data (525) is divided into block data 000 (530) BD000, block data 001 (531) BD001, and block data 00m (532) BD00m. The same applies to a case where the VM10 (502) writes the user data (545) into the VL10 (540). The user data is divided into block data 100 (550) BD000, block data 101 (551) BD101, and block data 10 n (552) BD10n. The block data thus created is generally subjected to a process called deduplication before being encrypted, and the block data in which duplication is detected is not subjected to writing into the physical drive, and the address of the writing destination in the volume and the address of the drive storing the duplicated block are managed in association with each other. When a read request is received for the block, data is read from the address of the drive associated with the address of the volume, and a response is made. Alternatively, the block data thus created may be subjected to a process generally called compression before being encrypted, and then the compressed data may be encrypted and written into a drive. Generally, in encrypted data, efficiency of capacity reduction by deduplication or compression is reduced. However, by executing the deduplication process or the compression process before the encryption in this manner, the write block can be encrypted and stored in the drive without reducing the efficiency of capacity reduction.

When the block data to be actually written is determined as described above, SN0 (100) writes each block data to the corresponding physical drive. FIG. 5 illustrates a state in which BD000 (530) belonging to SP0 (510) and BD100 (550) belonging to SP1 (511) are both written to the physical drive 00 (560).

As described above, a state in which the user data written from the compute node to different storage pools is stored in one physical drive is realized.

Next, information and data arranged and used in the memory 305 of the storage control node 100, 101, 102, 200, 201, 202 will be described with reference to FIGS. 6, 7, and 8. At least a storage control node OS 600, a storage control program 601, storage configuration information 610, storage pool access permission host information 611, key-related information 612, plain text user data 640, and encrypted text user data 641 are arranged in the memory. The storage control program 601 includes an IO processing unit 620 that executes at least the entire IO processing, and an encryption/decryption-related processing unit 621 that executes processing related to decryption of user data. The encryption/decryption-related processing unit 621 includes a key management server communication unit 630 that controls and executes communication with a key management server, a key-related processing unit 631 that executes processing related to a key including generation of a key used to encrypt/decrypt the user data, and an encryption/decryption calculation unit 632 that actually encrypts/decrypts the user data. The IO key is generated using information included in the storage pool access permission host information 611 and the key-related information 612. Details will be described with reference to FIGS. 7, 8, and 9. Each of the three drawings is illustrated in a table format, but may be in another format as long as the relationship of the included information is maintained.

FIG. 7 illustrates the storage configuration information table 700. The table indicates information groups included in the storage configuration information 610 and necessary for realizing the present embodiment.

The storage configuration information table 700 has, as elements, identifiers (701) of all the storage pools configured in the storage cluster, areas (addresses) 703 of the physical drives constituting the respective storage pools, identifiers 702 of the physical drives providing the respective storage areas, and identifiers 701 of the storage control nodes on which the respective physical drives are mounted. On the basis of the information included in the table, the IO processing unit in the storage control program 601 identifies the writing destination physical drive of the user data requested to be written and the reading source physical drive of the user data requested to be read.

FIG. 8 illustrates the storage pool access permission host table 800. The table indicates an information group included in the storage pool access permission host information 611 and necessary for realizing the present embodiment.

The storage pool access permission host table 800 has, as elements, an identifier 801 of each storage pool, and an identifier 801 of a physical machine or a virtual machine that is permitted to access each storage pool. It is assumed that both the physical machine and the host machine that are permitted to access one storage pool belong to one tenant. The correspondence relationship between the identifier 801 of the physical machine or the virtual machine and the identifier of the tenant may be separately managed. In addition, the identifier of the tenant may be managed in association with the identifier of the storage pool.

FIG. 9 illustrates an IO key generation information table 900, a drive key/IO key table 910, and a storage pool key table 920. These three tables indicate information groups included in the key-related information 612 and necessary for realizing the present embodiment.

The IO key generation information table 900 is a table including information related to a method of generating an IO key which is a key directly used to decrypt the user data. Specifically, the IO key generation element number 901 indicates a type (number) of data used to generate an IO key, the IO key generation algorithm 902 indicates an algorithm for generating an IO key using the number of elements indicated by the IO key generation element number 901, and the IO key generation element 903 indicates a name of specific information of the number indicated by the IO key generation element number 901. The IO key generation information table 900 indicates that the number of IO key generation elements is 2, the IO key generation algorithm uses the SHA-512 hash algorithm after concatenating two IO key generation elements, and the two IO key generation element numbers are the physical drive key and the storage pool key. In a case where the content of the IO key generation information table 900 is as described above, a bit string obtained by concatenating a physical drive key and a storage pool key is input to the SHA-512 hash calculation engine, and an output thereof is set as an IO key.

The drive key/IO key table 910 includes a value 913 of a key allocated to each physical drive, an identifier 912 allocated to the value, and a value 915 of an IO key allocated to each physical drive for each storage pool 914. The key-related processing unit 631 dynamically obtains the IO key value 915 according to the content of the above-described IO key generation information table 900, and arranges the IO key value in the corresponding cell. In a case where it is described in the IO key generation information table 900 that the IO key is generated from the physical drive key and the storage pool key, the storage pool key refers to the storage pool key 920. The key management server communication unit 630 acquires the identifier 912 of the physical drive key and the value 913 of the key from the key management server 130 and arranges them in the corresponding cell.

The storage pool key table 920 includes a value 923 of a key allocated to each storage pool 921 and an identifier 922 allocated to the value. The key management server communication unit 630 acquires the identifier 922 of the storage pool key and the value 923 of the key from the key management server 130 and arranges them in the corresponding cell.

In the example of the IO key generation information table 900, the drive key/IO key table 910, and the storage pool key table 920, the bit string obtained by concatenating the physical drive key and the storage pool key is input to the SHA-512 hash calculation engine, and the output is used as the IO key. However, the method of generating the IO key is not limited to this method. For example, in addition to the storage pool key, a key may be allocated to each volume illustrated in FIG. 5, and three of the key, the storage pool key, and the physical drive key may be used, or the storage pool ID may be used as one element instead of the storage pool key to generate the IO key. In any case, an element for generating one IO key and an algorithm for generating one IO key are described in the IO key generation algorithm 902 in the drive key/IO key table 910.

Figure 10:
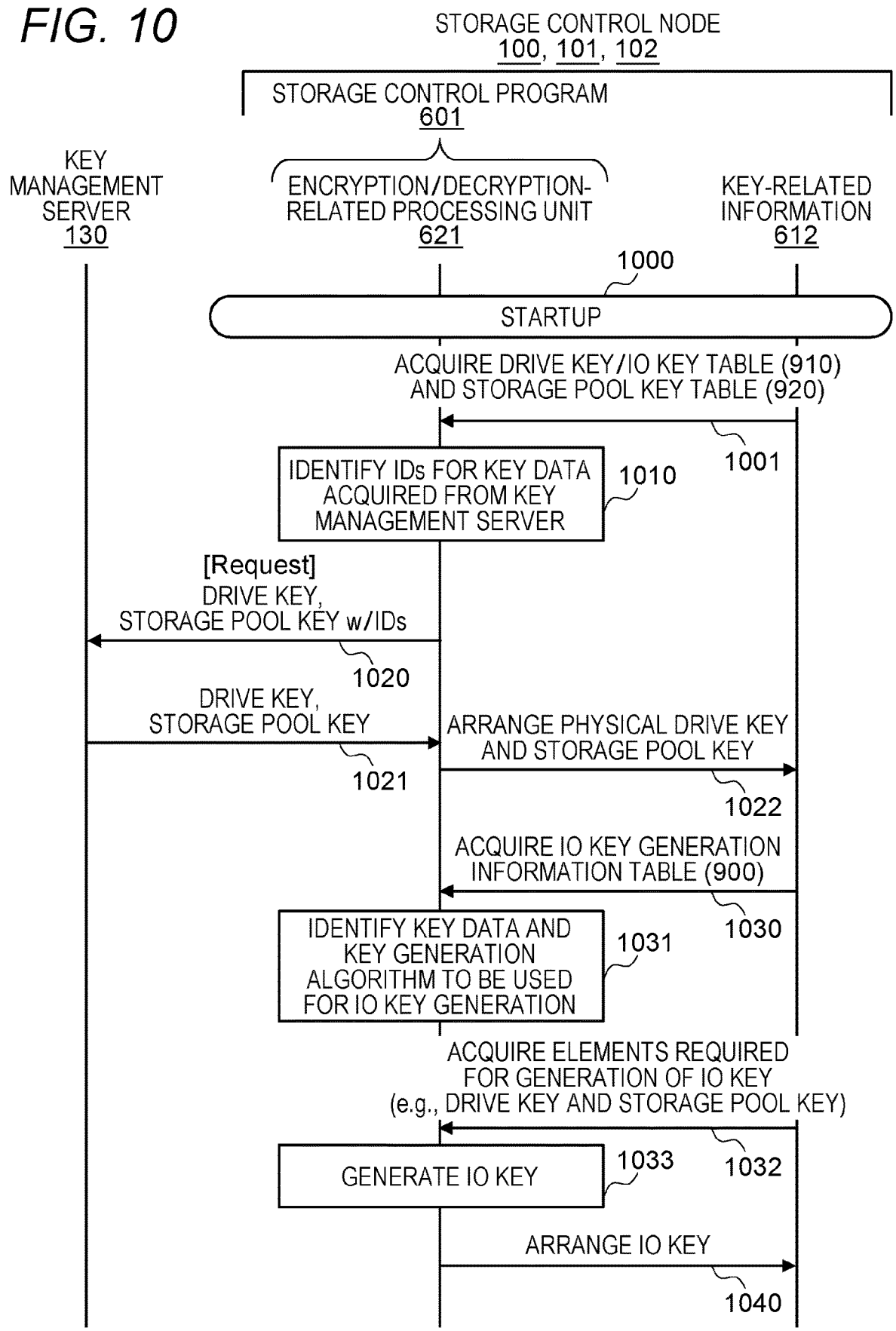
FIG. 10 is a diagram illustrating an example of a processing sequence according to the embodiment.
Figure 11:
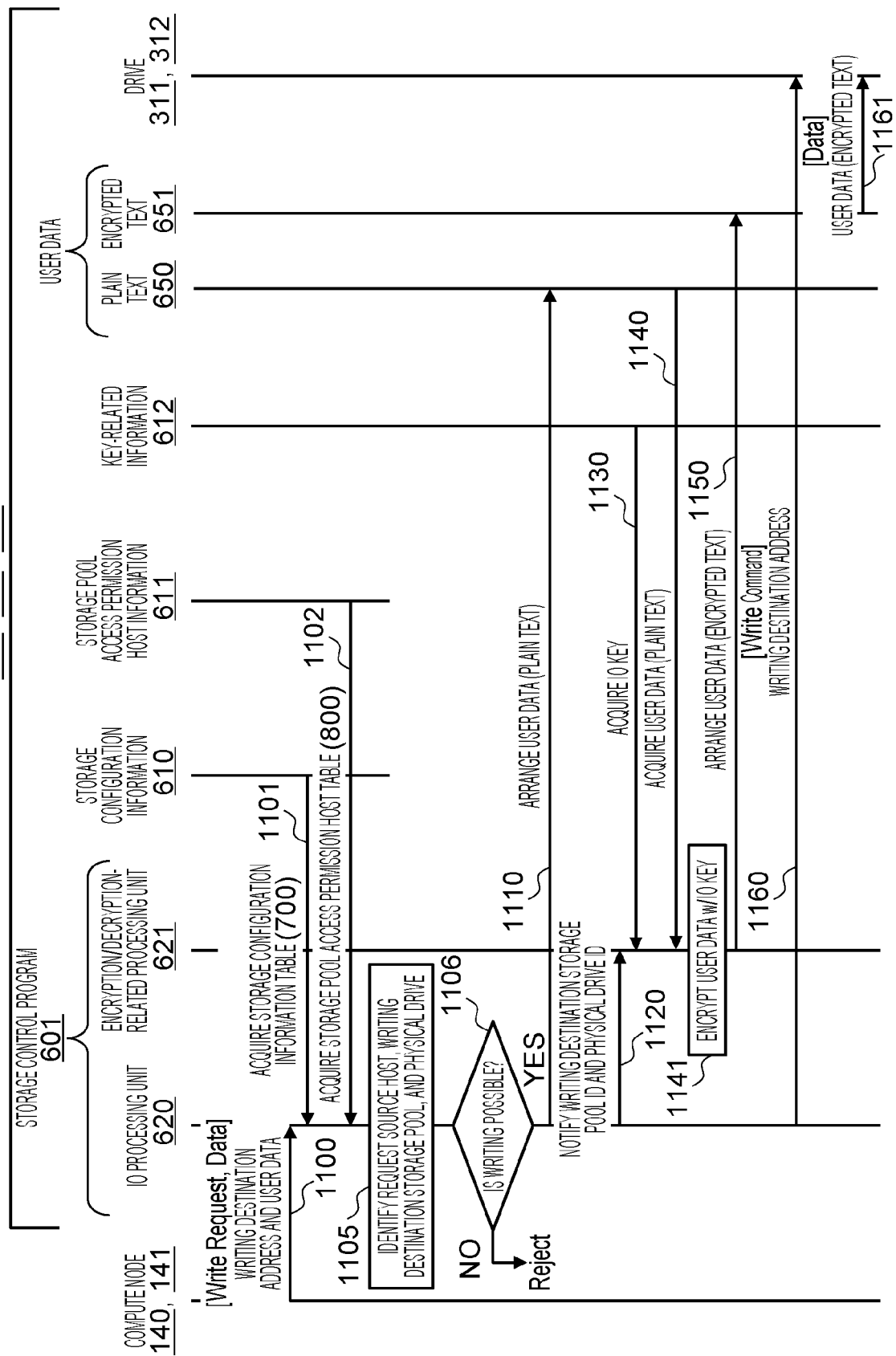
FIG. 11 is a diagram illustrating an example of a processing sequence according to the embodiment.
Figure 12:
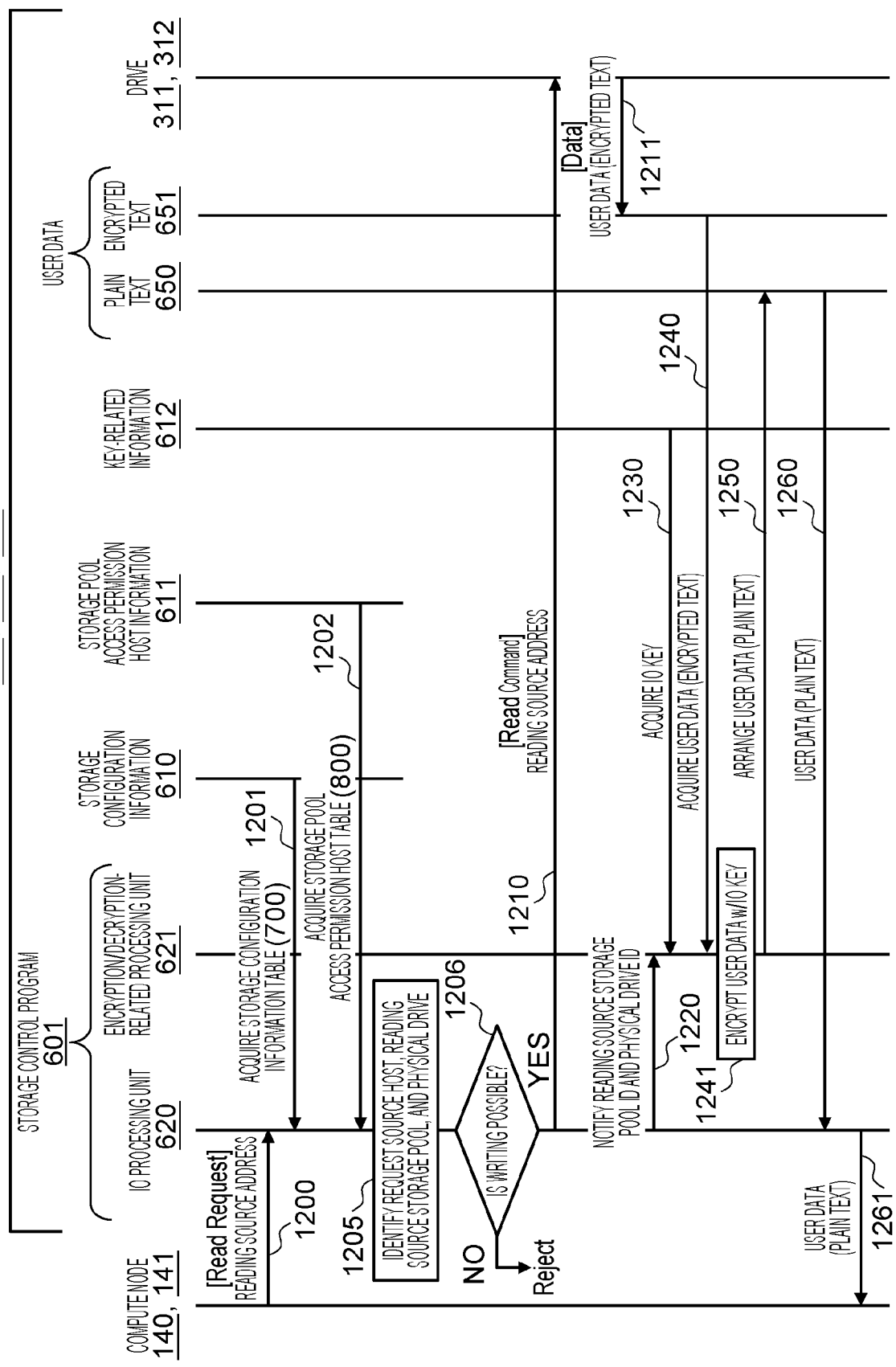
FIG. 12 is a diagram illustrating an example of a processing sequence according to the embodiment.

Next, a sequence of processing related to the present invention at the time of activation of the storage cluster, writing, and reading will be described with reference to FIGS. 10, 11, and 12. Note that the processing assumed to be executed immediately after activation in FIG. 10 may be executed in the write and read processing in FIG. 11.

First, processing immediately after activation of the storage cluster will be described with reference to FIG. 10.

Figure 6:
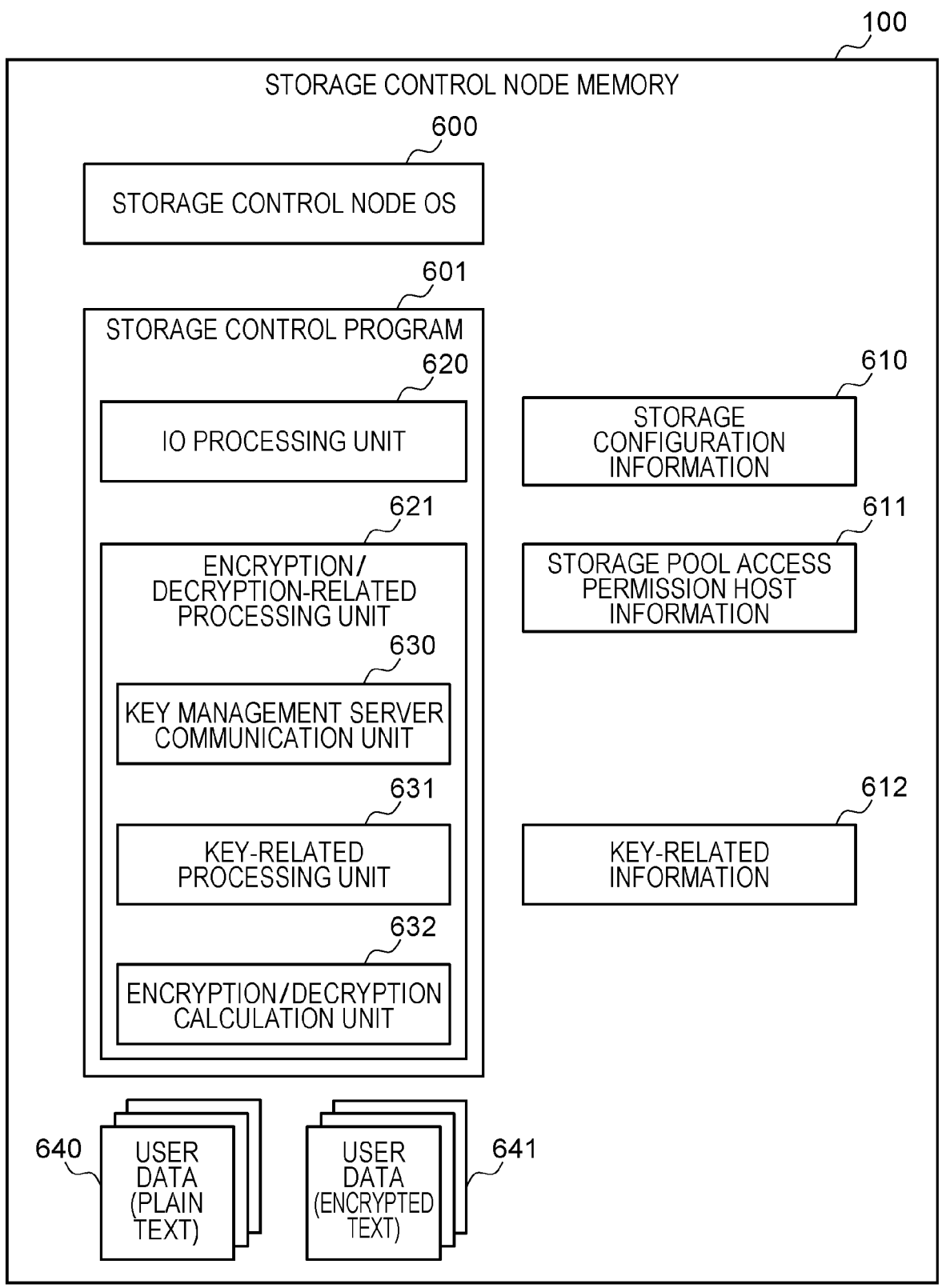
FIG. 6 is a diagram illustrating an example of a program and data arranged on a memory of the storage control node according to the embodiment.

When the storage cluster is activated, the storage control node OS (600), the storage control program 601, the storage configuration information 610, and the storage pool access permission host information 611 illustrated in FIG. 6 are read from the drive 0 (310) and arranged on the memory 305. The processing is executed during the startup 1000.

When the startup process 1000 is completed, the key-related processing unit 631 in the encryption-related processing unit 621 acquires the drive key/IO key table 910 and the storage pool key table 920 on the memory 305 (1001). The identifier of the key allocated to each physical drive of the own storage cluster and the identifier of the key allocated to each constructed storage pool are identified with reference to the two tables (1010). When the identifier of the used key is identified, the key management server communication unit 630 in the encryption-related processing unit 621 attaches the identified identifier and requests the key management server 130 to transmit the key to which the identifier is allocated (1020).

Upon receiving the request and the identifier, the key management server 130 transmits the corresponding key to the key management server communication unit 630 in the encryption-related processing unit 621 (1021). The transmission of the request for the key to the key management server 130 and the reception of the key in response to the server may be performed by each storage control node constituting the storage cluster, or may be performed by several nodes as representatives. In the latter case, the storage control node that has received the key transmits the received key to another storage control node.

When the key transmitted by the key management server 130 is received by the key management server communication unit 630 in the encryption/decryption-related processing unit 621, the key-related processing unit 631 in the encryption-related processing unit 621 arranges the received physical drive key group and storage pool key group in the drive key/IO key table 910 and the storage pool key table 920 in the key-related information 612 on the memory.

Subsequently, the key-related processing unit 631 in the encryption-related processing unit 621 acquires the IO key generation information table 900 in the key-related information 612 on the memory, and identifies the element number 901 necessary for generating an IO key, the IO key generation algorithm 902, and the elements 903 necessary for generating an IO key (1031). Then, according to the aforementioned content, the key-related processing unit 631 in the encryption/decryption-related processing unit 621 acquires elements necessary for generating an IO key (1032). When the element is acquired, the processing unit generates (1033) an IO key according to the IO key generation algorithm 902 identified in the processing 1031, and arranges (1040) the generated IO key in the IO key cell (915) in the drive key/IO key table 910 in the key-related information 612 on the memory. Similarly to the communication with the key management server 130, the generation of the IO key may be performed by each storage control node or may be performed by several nodes as representatives. In the latter case, the storage control node that has generated the IO key transmits the generated IO key to another storage control node.

Next, writing processing of the user data will be described with reference to FIG. 11.

When the IO processing unit 620 receives the write request of the user data, the writing destination address, and the user data (1100) transmitted by the compute node 140, 141, the processing unit acquires the storage configuration information 700 and the storage pool access permission host table 800 in the key-related information 612 on the memory (1101, 1102). In addition, the processing unit identifies a source host (physical machine, virtual machine, etc.) of the request and the user data, a writing destination storage pool, and a physical drive (1105). Subsequently, the processing unit determines whether or not the received write request for the user data is executable on the basis of the identified source host of the request and the user data, as well as the content described in the acquired storage pool access permission host table 800 (1106). In a case where the request is not executable, the request is rejected. In a case where the request is executable, the received user data is arranged on the memory (1110).

Subsequently, the IO processing unit notifies the writing destination storage pool and the identifier of the physical drive being identified to the key-related processing unit 631 in the encryption/decryption-related processing unit 621 (1120). Upon receiving the notification, the key-related processing unit 631 acquires the IO key allocated to the combination of the storage pool and the physical drive, as well as the user data (plain text) from the drive key/IO key table 910 on the memory (1130, 1140). Then, the acquired IO key and user data (plain text) are passed to the encryption/decryption calculation unit 632 in the encryption/decryption-related processing unit 621.

Upon receiving the IO key and the user data (plain text), the encryption/decryption calculation unit 632 encrypts the user data transferred using the key (1141) and places the user data on the memory (1150).

When the encryption/decryption calculation unit 632 arranges the user data (encrypted text) on the memory, the IO processing unit 620 designates the writing destination address and writes the user data (encrypted text) into the physical drive (1160, 1161).

Next, reading processing of the user data will be described with reference to FIG. 12.

When the IO processing unit 620 receives the read request and the reading source address (1200) of the user data transmitted by the compute node 140, 141, the processing unit acquires the storage configuration information 700 and the storage pool access permission host table 800 in the key-related information 612 on the memory (1201 and 1202). In addition, the processing unit identifies a source host (physical machine, virtual machine, etc.) of the request, a reading source storage pool, and a physical drive (1105). Subsequently, the processing unit determines whether or not the received read request for the user data is executable on the basis of the identified source host of the request and the user data, as well as the content described in the acquired storage pool access permission host table 800 (1206). In a case where the request is not executable, the request is rejected. In a case where the request is executable, a reading source address is designated, and user data (encrypted text) is read from the physical drive and arranged on the memory (1210, 1211).

Subsequently, the IO processing unit notifies the reading source storage pool and the identifier of the physical drive being identified to the key-related processing unit 631 in the encryption/decryption-related processing unit 621 (1220). Upon receiving the notification, the key-related processing unit 631 acquires the IO key allocated to the combination of the storage pool and the physical drive, as well as the user data (encrypted text) from the drive key/IO key table 910 on the memory (1230, 1240). Then, the acquired IO key and user data (encrypted text) are passed to the encryption/decryption calculation unit 632 in the encryption/decryption-related processing unit 621.

Upon receiving the IO key and the user data (encrypted text), the encryption/decryption calculation unit 632 decrypts the user data transferred using the key (1241) and places the user data on the memory (1250).

When the encryption/decryption calculation unit 632 arranges the user data (plain text) on the memory, the IO processing unit 620 transmits the user data (plain text) to the read-requesting host (1260, 1261).

As described in the foregoing, the information processing system disclosed includes the physical drive (311, etc.) that statically stores data, the compute unit (140, etc.) that operates an application program, and the storage control unit (100, etc.) that processes a data input/output request by the compute unit that has received an instruction from the application program.

The storage control unit includes the IO processing unit 620 that executes writing of the data into the physical drive and reading of the data from the physical drive on a basis of the input/output request, and the encryption/decryption-related processing unit 621 that performs encryption/decryption of the data.

The encryption/decryption-related processing unit 621 is capable of referring to the key-related information 612 as the key generation method information, including at least one element used to generate a key used to encrypt/decrypt the data and an algorithm for generating a key by using the element.

The encryption/decryption-related processing unit 621 generates a key used to encrypt/decrypt the data according to a content set in the key generation method information, and encrypts data received from the compute unit by the IO processing unit 620 or decrypts data read from the physical drive by the IO processing unit 620 by using the key.

The IO processing unit 620 writes data encrypted by the encryption/decryption-related processing unit 621 into the physical drive, and transmits the data decrypted by the encryption/decryption-related processing unit 621 to the compute unit.

It is thus possible to provide a highly reliable information processing system.

In addition, the encryption/decryption-related processing unit 621 generates the key by using at least two elements including at least an element specified depending on the compute unit and an element specified depending on the physical drive.

For this reason, for example, in a case where a part of the physical drives mounted in the information processing system is bundled to configure the logical storage area, when any physical drive is replaced or the physical drive is illegally taken out, even if the key allocated to the physical drive is discarded, the data in the encrypted text state stored in another physical drive being used can be used as it is. Then, by discarding the key allocated to the replaced or illegally taken out physical drive, it is possible to prevent data stored on the physical drive from leaking in the plain text state. In addition, the above state can be realized by performing encryption and decryption of data only once.

In addition, the IO processing unit 620 divides data received from the compute unit into at least one blocks and writes each block into a different physical drive in a plurality of physical drives, and the key generation method information specifies, as elements used for generating the key, a key allocated for each physical drive and a key associated with a logical storage area provided to a host configured in the compute unit.

With this configuration, information leakage can be prevented when either the host or the physical drive is changed.

In addition, the IO processing unit 620 divides data received from the compute unit into at least one blocks and writes each block into a different physical drive in a plurality of different physical drives, and the key generation method information specifies, as elements used to generate the key, a key allocated for each physical drive and at least a piece of information managed by the storage control unit.

With this configuration, information leakage can be prevented when either the physical drive or the storage control unit is changed.

In addition, the IO processing unit 620 divides the data received from the compute unit into at least one block, confirms whether a block having the same value as the block has already been stored in the storage before executing the encryption process, creates information associating the writing destination address of the volume and the address of the stored block without passing the block confirmed to be stored to the encryption/decryption-related processing unit 621, and stores the information in the storage.

With this configuration, both prevention of information leakage and data duplication prevention can be achieved.

The IO processing unit 620 divides the data received from the compute unit into at least one block and compresses the block, and the encryption/decryption-related processing unit 621 encrypts the compressed block.

With this configuration, both prevention of information leakage and data capacity reduction can be achieved.

The present invention is not limited to the above-described embodiments, and encompasses various modifications. For example, the above-described embodiments have been described in detail for the sake of comprehensible explanation of the present invention, and are not necessarily limited to those provided with all the described configurations. In addition, not only deletion of the configuration, replacement and addition of the configuration are possible.

For example, although the configuration and operation in which the key is generated each time have been described as an example, the key may be generated and stored at the time of system construction, and the stored key may be read and used until the configuration is changed.

What is claimed is:

1. An information processing system comprising:
   a physical drive that statically stores data;
   a compute unit that operates an application program; and
   a storage control node that processes a data input/output request by the compute unit that has received an instruction from the application program, and includes at least a CPU, a memory, and an input/output device all communicatively coupled to each other, wherein the storage control node is configured to:
   execute writing of the data into the physical drive and reading of the data from the physical drive on a basis of the data input/output request,
   acquire, from the memory, drive key/IO key information and storage pool key information,
   identify, using the drive key/IO key information and the storage pool key information, a first identifier of a key allocated to the physical drive and a second identifier of a key allocated to a storage pool,
   attach the first identifier and the second identifier to a request for keys corresponding to each of the first identifier and the second identifier, and transmit the request to a key management server,
   receive, from the key management server, a physical drive key and a storage pool key that correspond to the first identifier and the second identifier, respectively,
   arrange, within the memory, the physical drive key into the drive key/IO key information and the storage pool key into the storage pool key information,
   acquire, from the memory, IO key generation information including an element number for generating an I/O key used to encrypt/decrypt the data, an IO key generation algorithm, and IO key generation elements,
   generate the IO key using the IO key generation information, the physical drive key, and the storage pool key, and save the IO key in the IO key generation information in the memory,
   encrypt data received from the compute unit using the IO key to form encrypted data or decrypt data read from the physical drive using the IO key to form decrypted data, and
   write the encrypted data into the physical drive, and transmit the decrypted data into the compute unit.

2. The information processing system according to claim 1, wherein the storage control node is further configured to:
   divide the data received from the compute unit into at least one block and write each of the at least one block into a different physical drive in a plurality of the physical drives, and
   specify, as elements used to generate the IO key, a key allocated to each of the plurality of physical drives and a key associated with a logical storage area provided to a host configured in the compute unit.

3. The information processing system according to claim 1, wherein the storage control node is further configured to:
   divide the data received from the compute unit into at least one block and write each of the at least one block into a different physical drive in a plurality of physical drives, and
   specify, as elements used to generate the IO key, a key allocated to each of the plurality of physical drives and at least one piece of information managed by the storage control unit.

4. The information processing system according to claim 1, wherein the storage control node is further configured to:
   divide the data received from the compute unit into at least one block and check whether a block having the same value as the at least one block is already stored in the memory before executing an encryption process, and
   create information for associating a writing destination address of a volume with an address of the stored block and store the information in the storage.

5. The information processing system according to claim 1, wherein the storage control node is further configured to:
   divide the data received from the compute unit into at least one block, compress the at least one block into a compressed block, and encrypt the compressed block.

6. An information processing method for an information processing system including a physical drive that statically stores data, a compute unit that operates an application program, and a storage control node that processes a data input/output request by the compute unit that has received an instruction from the application program, and includes at least a CPU, a memory, and an input/output device all communicatively coupled to each other, the information processing method comprising:

writing of the data into the physical drive and reading of the data from the physical drive on a basis of a data input/output request;

acquiring, from the memory, drive key/IO key information and storage pool key information;

identifying, using the drive key/IO key information and the storage pool key information, a first identifier of a key allocated to the physical drive and a second identifier of a key allocated to a storage pool;

attaching the first identifier and the second identifier to a request for keys corresponding to each of the first identifier and the second identifier, and transmitting the request to a key management server;

receiving, from the key management server, a physical drive key and a storage pool key that correspond to the first identifier and the second identifier, respectively;

arranging, within the memory, the physical drive key into the drive key/IO key information and the storage pool key into the storage pool key information;

acquiring, from the memory, IO key generation information including an element number for generating an I/O key used to encrypt/decrypt the data, an IO key generation algorithm, and IO key generation elements;

generating the IO key using the IO key generation information, the physical drive key, and the storage pool key, and saving the IO key in the IO key generation information in the memory;

encrypting data received from the compute unit by using the IO key to form encrypted data, or decrypting data read from the physical drive by using the IO key to form decrypted data; and writing the encrypted data into the physical drive, or transmitting the decrypted data to the compute unit.

* * * * *